INVENTORS:
Gerhard Heyner
York Rogowsky
Robert Jötten
Winfried Muttelsee
Reiner Foerst BY Spencer & Kaye
Attorneys INVENTORS:
Gerhard Heyner
York Rogowsky
Robert Jötten
Winfried Muttelsee
Reiner Foerst
BY Spencer & Kaye
Attorneys United States Patent Office 3,447,066

Patented May 27, 1969

3,447,066

CURRENT CONTROL CIRCUIT FOR AUTOMATICALLY BALANCING ARBITRARILY VARIABLE PRESET CURRENT VALUES

Gerhard Heyner and York Rogowsky, Berlin, Robert Jötten, Darmstadt, and Winfried Muttelsee and Reiner Foerst, Eppelheim, Germany, assignors to Licentia Patent-Verwaltungs-G.m.b.H., Frankfurt am Main, and 400 kV-Farchungsgemeinschaft e.V., Heidelberg, Germany Filed Feb. 15, 1967, Ser. No. 616,219

Claims priority, application Germany, Feb. 18, 1966, L 52,900

Int. Cl. G05f 1/10, 3/02, 3/00

U.S. Cl. 323—1 5 Claims

ABSTRACT OF THE DISCLOSURE

The currents in a plurality of conductors are automatically balanced to maintain a constant sum value by a control circuit which includes a first current summing circuit coupled to all of the current conductors, an amplifier coupled to the output of the first current summing circuit, and a plurality of additional current summing circuits each coupled to the amplifier output and to a corresponding one of the current conductors to add a correction current thereto when the sum of currents deviates from a predetermined sum value. The amplifier output is coupled to the additional current summing circuits through variable impedance elements whose setting determines the ratio between the correction currents applied to individual current conductors.

*Background of the invention*

It often occurs in the art that nominal values of a system that for certain reasons must form a fixed sum at any time are to be varied as independently from each other as possible. In some cases, this condition is met by the physical behavior of the system. In other cases, the condition must be met artificially. Up to now it was, therefore, necessary to either exclude an arbitrary change or to accept deviations from the desired sum. A high tension direct current transmission is, for instance, such a system. The physical behavior of this system requires that the sum of the station currents of positive or negative value equals zero (stationary case, losses disregarded). In order to control the direct currents of the individual stations, it is necessary that their rated values be proportioned in such a manner that the above-mentioned physical requirement of the system is met. In this case, the rated values are identical with the corresponding actual values. Such a balancing becomes more difficult the more stations participate in such a high tension direct current transmission system. It would, therefore, be desirable to have this balancing action occur automatically so that upon arbitrary change of one rated value the rated values of the remaining stations are adjusted in accordance with the physical requirement. The invention, therefore, relates to a circuit arrangement for the automatic balancing of arbitrarily variable preset current values, each having one associated output value, particularly a rated current value for the station current of a high tension direct current transmission system, whereby the output values are to form a certain adjustable sum at any given time.

*Summary of the invention*

In accordance with this invention, the above-noted problem is solved by providing a closed control loop containing a first current summing circuit coupled to all of the current conductors, an amplifier coupled to the output of the first current summing circuit, and a plurality of additional current summing circuits each coupled to the amplifier output and to a corresponding one of the current conductors to add a correction current thereto when the sum of the currents deviates from a predetermined sum value. The first current summing means includes means for presetting the predetermined sum current value, and the amplifier output is coupled to the additional current summing circuits through variable impedance elements. This circuit make it possible that upon changes in one or several preset current values, the associated output value(s) change in the desired direction and all other remaining output values are changed in such a manner that the desired sum remains unchanged. This automatic balancing further lessens the danger of overloading a station when it is forced to meet the physical requirements.

*Description of the preferred embodiment*

Figure 1:
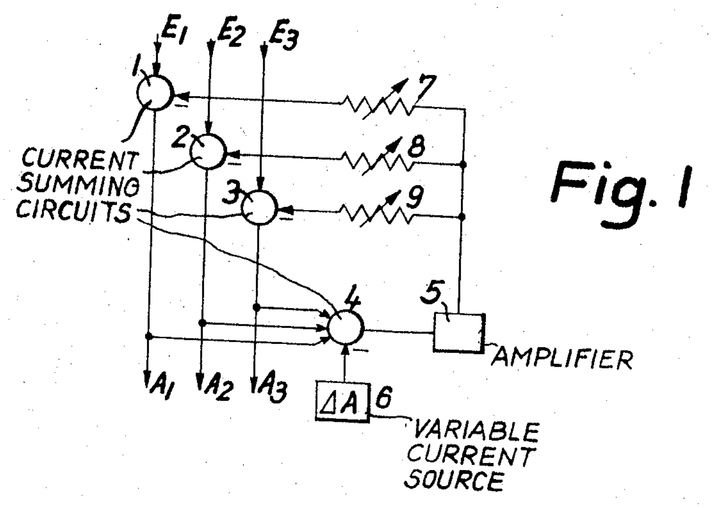
FIGURE 1 is a block diagram of one embodiment of the invention.

FIGURE 1 is a block diagram of a closed control circuit according to this invention for balancing three current values. In general, however, any desired number of current values can be balanced in the same manner. The preset current values E1 to E3 from a respective arbitrary sum. The corresponding output values A1 to A3 can represent the rated current values of the station currents and must form a constant, adjustable sum. The output values A1 to A3 are added together in a current summing circuit 4. If the sum of these output values is to be equal to zero, the output of summing circuit 4 is fed directly into an amplifier 5 whose output value is added to the preset current values E1 to E3 in such a manner that the output values A1 to A3 form the desired sum of zero. If the sum of the output values A1 to A3, however, is to be equal to a non-zero preset sum value $\Delta A$, either positive or negative, then this desired sum $\Delta A$ is subtracted from the sum of A1 to A3 in summing circuit 4.

This is done by applying a current $\Delta A$ of the opposite polarity from a variable current source 6 to the current summing circuit 4. Thus the variable current source 6, in combination with the current summing circuit 4, constitutes a means for presetting the desired sum current value. The output signal of current summing circuit 4 constitutes a deviation signal which is proportional to the difference between the sum of all of the currents and the predetermined sum current value which is preset by means of variable current source 6. This deviation signal is applied for amplification to amplifier 5, and thence through variable impedance elements 7, 8, and 9 to additional current summing circuits 1, 2, and 3, which are coupled in series with the corresponding current conductors. Current summing circuits 1, 2, and 3 add a correction current which is a function of the magnitude of the amplified deviation signal to their respective conductors.

The amplification of the amplifier 5 must be very large so that its output signal still acts upon the summation members 1 to 3 even when the output value of summing circuit 4 is practically zero. It is preferable to utilize a variable gain circuit for amplifier 5. By appropriate adjustment of variable impedance elements 7, 8, and 9, it is possible to effect variation in the action of the summing circuits 1, 2, and 3.

During a control operation, a slight detuning (ΔA) within the control current circuit of a high tension direct current transmission system will actuate the current control of ($n$—1) station out of $n$ stations while one station will determine the voltage.

In order to make the slight detuning ΔA required for the method ineffective for the current-controlled stations, it is applied only to the station determining the voltage.

Figure 2:
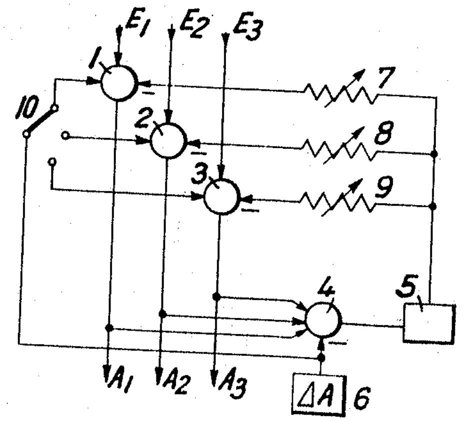
FIGURE 2 is a block diagram of a modification of the embodiment shown in FIGURE 1.

As shown in FIGURE 2, this can be accomplished by additionally feeding ΔA to the corresponding summing circuit by means of a switch 10. The effect is then as follows: If the sum of the preset current values equals zero, the sum of the output values equals ΔA because only one of the output values deviates from its preset current value by ΔA. If the sum of the preset current values, however, is other than zero, then the sum other than zero is fed through the amplifier 5 in conformity with the variable impedance elements 7 to 9 to all summing circuits 1 to 3. The desired additional value ΔA, however, is fed to only a single one of the summing circuits 1 to 3 by means of the switch 10. Accordingly, the value ΔA only influences one output value.

Figure 3:
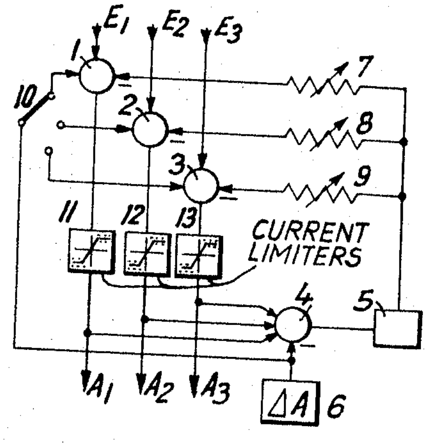
FIGURE 3 is a block diagram of a modification of the embodiment shown in FIGURE 2.

In FIGURE 3, current limiters 11, 12 and 13 are provided between the summing circuits 1, 2 and 3 and the summing circuit 4 to prevent the output values A1 to A3 from exceeding a certain adjustable value. The arrangement of the current limiters between the summing circuits 1 to 3 on the one hand and the summing circuit 4 on the other hand guarantees that the desired sum of the output values A1 to A3 is maintained even when one of these output values is limited by its current limiter. Upon actuation of one or a plurality of the current limiters, the desired sum of the output values in this circuit is adjusted through the amplifier 5.

Figure 4:
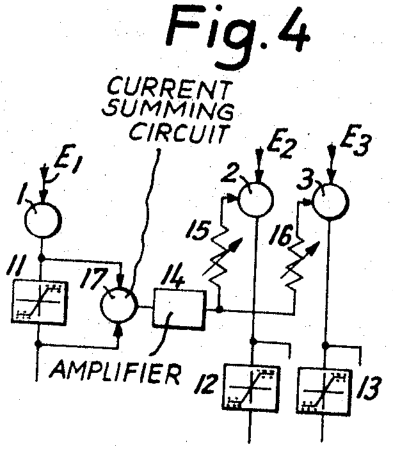
FIGURE 4 is a block diagram of a modification of the embodiment shown in FIGURE 3.

According to FIGURE 4 it is, however, possible to apply the difference originating in a current limiter when the latter is actuated through an amplifier 14 and adjustable impedances 15 and 16 directly to the other summing circuits.

In some cases it might be desired that one of the output values, for instance A1, maintain a certain adjustable value, independent from the manner in which the preset current values associated with the remaining output values change. This can be effected in a very simple manner by continuously changing the preset current value E1 associated to the corresponding output value A1 in such a manner by means of an additional control loop that the desired output value remains the same. The additional control loop can, for instance, be a control circuit for the control of station power.

Figure 5:
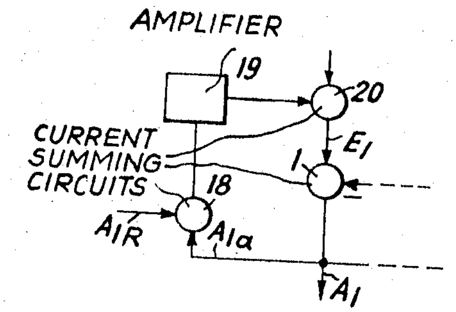
FIGURE 5 is a block diagram of another modification of the embodiment shown in FIGURES 1 through FIGURE 4.

FIGURE 5 shows such a circuit arrangement based on FIGURE 1. Such circuit arrangements can, of course, also be provided for the circuit arrangements shown in FIGURES 2 to 4. It can be seen that the output value A1 furnished by summing circuit 1 is fed as actual value $A1_a$ and the desired output value as rated value $A1_r$ into an additional summing circuit 18 whose output value is then fed into a further summing circuit 20 through an amplifier 19, whereby the preset current value E1 fed into summing circuit 1 is changed in the desired manner.

It is, of course, also possible to interpose a current limiter between amplifier 19 and summing circuit 20 to guarantee that the preset current value E1 will not exceed certain limits.

The circuits according to this invention are definitely not limited to high tension direct current transmission systems. They can also be utilized advantageously for polyphase alternating current interconnections to aid in load distribution.

Figure 6:
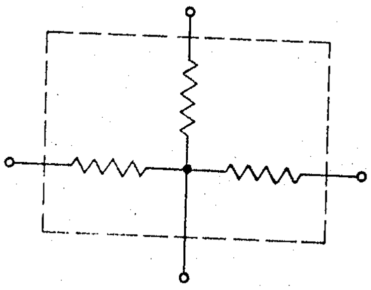
FIGURE 6 is a schematic circuit diagram of one illustrative circuit for the current summers shown in FIGURES 1 through 5.
Figure 7:
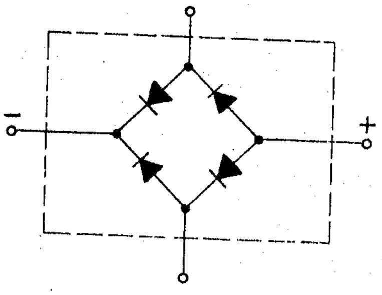
FIGURE 7 is a schematic circuit diagram of one illustrative circuit for the current limiters shown in FIGURES 3 and 4.
Figure 8:
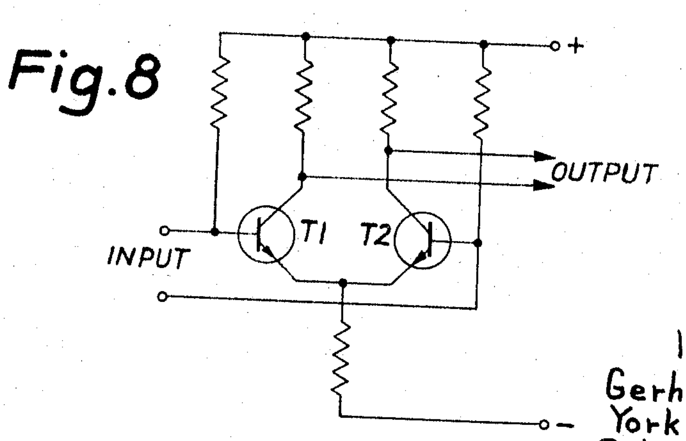
FIGURE 8 is a schematic circuit diagram of one illustrative circuit for the amplifiers shown in FIGURES 1 through 5.

The above-described circuits are shown in block diagram form in FIGURES 1 to 5. FIGURE 6 shows a specific circuit which can be used for summing circuits 1, 2, 3, 4, 17, 18, and 20, which consist of ohmic resistances connected together at a summing junction. FIGURE 7 shows an example of a suitable circuit for the current limiters 11, 12, and 13. They each consist of a biased rectifier bridge circuit whose bias voltage is adjustable. FIGURE 8 shows an example of a suitable circuit for amplifiers 5, 14, and 19. These essentially consist of two transistors T1 and T2, each working in phase opposition. If the amplification is not sufficient, further amplification stages can be coupled to the outputs.

We claim:

1. A current control circuit for automatically controlling the magnitude of currents in a plurality of current conductors so as to maintain a predetermined sum value for all of the currents, comprising, in combination:

(a) first current summing means coupled to all of said current conductors for summing said currents and for producing a deviation signal proportional to the difference between the sum of said currents and a predetermined sum current value, said first current summing means including means for presetting said predetermined sum current value;

(b) a high-gain amplifier coupled to said first summing means for amplifying said deviation signal;

(c) a plurality of additional current summing means each coupled in series with a corresponding one of said current conductors; and (d) a plurality of variable impedance elements each coupled between the output of said amplifier and a corresponding one of said additional current summing means for adding to each current conductor a correction current which is a function of the magnitude of said deviation signal.

2. A current control circuit as defined in claim 1 and further comprising a selection switch coupled between said means for presetting said sum current value and said additional current summing means for selectively coupling the output of said presetting means to any one of said additional current summing means.

3. A current control circuit as defined in claim 1 and further comprising a plurality of current limiting means each coupled in series with a corresponding current conductor between the output of the corresponding additional current summing means and the input of said first current summing means.

4. A current control circuit as defined in claim 3 and further comprising a further current summing means having two inputs coupled respectively to the input and output of one of said current limiting means and a further amplifier the input of which is coupled with the output of said current summing means, and a plurality of additional variable impedance elements each coupled between the output of said further amplifier and the additional current summing means of a corresponding current conductor.

5. A current control circuit as defined in claim 1 and further comprising second current summing means coupled to one of said current conductors on the output side of the corresponding additional current summing means for producing a second deviation signal proportional to the difference between the current magnitude in said current conductor and a predetermined value therefor, a second amplifier coupled to the output of said second current summing means for amplifying said second deviation signal, third current summing means coupled in series with said current conductor on the input side of said corresponding additional current summing means, and the output of said second amplifier means being coupled to said third current summing means to add a correction current proportional to said second deviation signal to said current conductor.

References Cited

UNITED STATES PATENTS

| | | | |
|---|---|---|---|
| 2,969,457 | 1/1961 | Felix et al. | 307—60 X |
| 3,125,677 | 3/1964 | Newell | 323—74 X |
| 3,375,435 | 3/1968 | Baugher | 323—74 X |

FOREIGN PATENTS

| | | |
|---|---|---|
| 734,316 | 7/1955 | Great Britain. |

JOHN F. COUCH, *Primary Examiner.*

A. D. PELLINEN, *Assistant Examiner.*

U.S. Cl. X.R.

307—24, 32, 53; 323—7, 74

UNITED STATES PATENT OFFICE

CERTIFICATE OF CORRECTION

Patent No. 3,447,066 Dated May 27th, 1969

Gerhard Heyner et al

It is certified that error appears in the above-identified patent and that said Letters Patent are hereby corrected as shown below:

In the heading of the patent, line 9, change "Farchungsgemeinschaft" to --Forschungsgemeinschaft--.

Column 2, line 10, change "make" to --makes--; line 47, change "from" to --form--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents